M. A. DEES.
ART OF AND MOLD FOR MAKING RUBBER TIRES.
APPLICATION FILED DEC. 23, 1912.
1,192,994.
Patented Aug. 1, 1916.
2 SHEETS—SHEET 1.
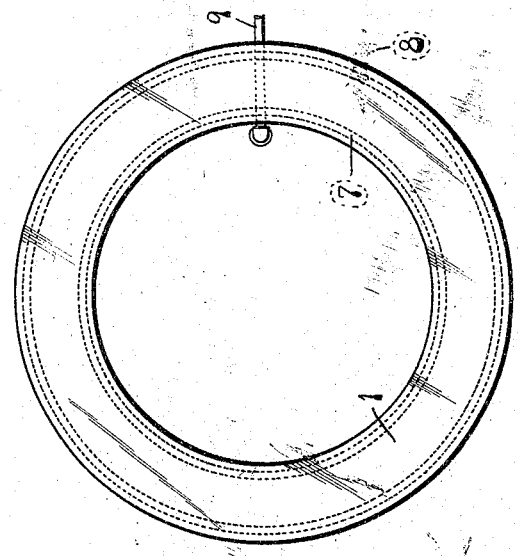
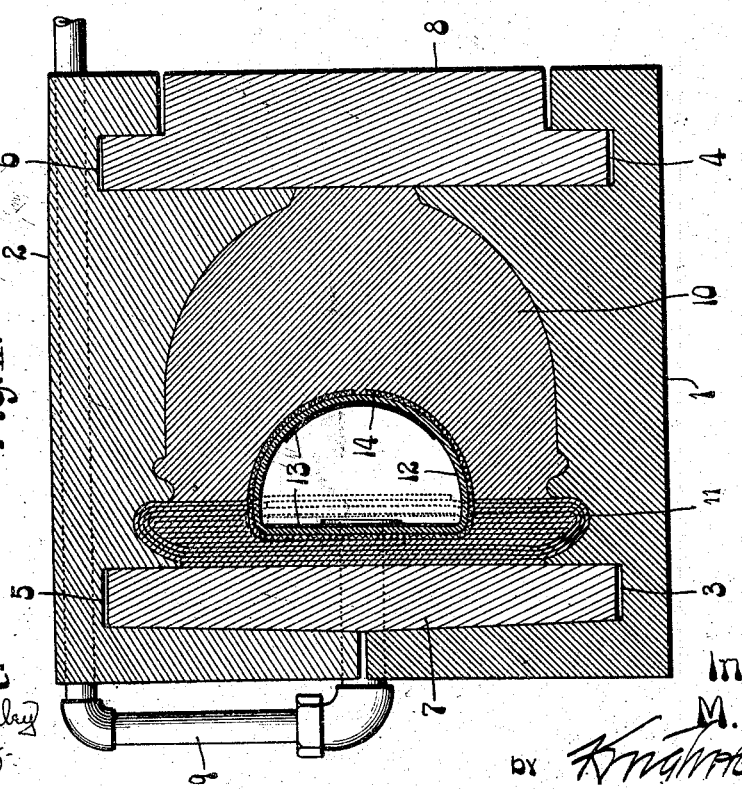
Attest
a. j. McCauley
E. B. —
Inventor.
M. A. Dees
by Knight Cook Attys.

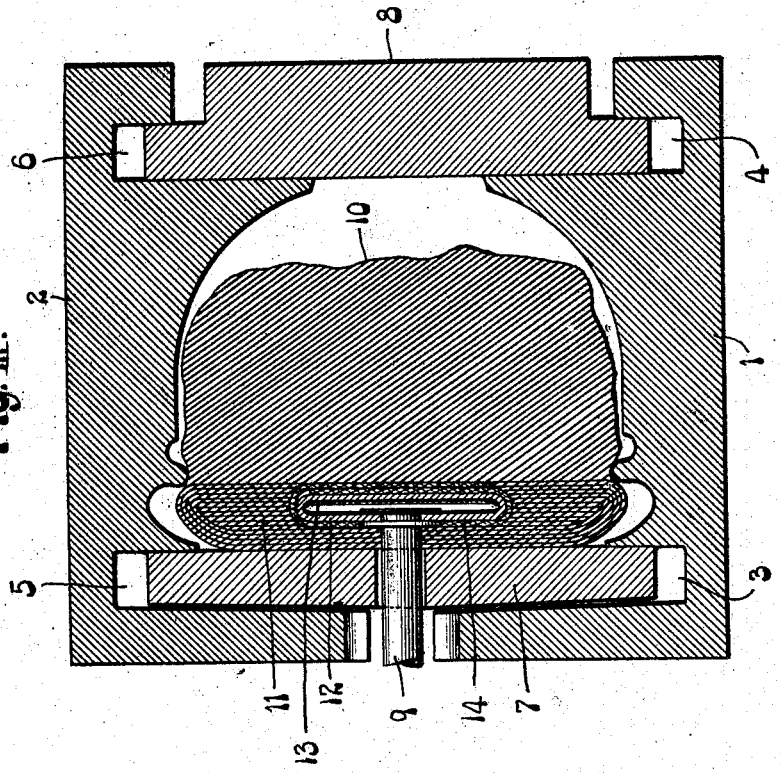
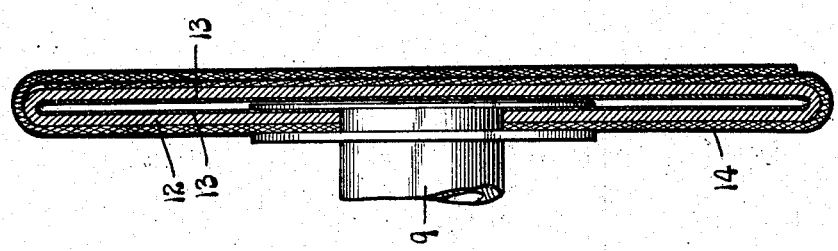

UNITED STATES PATENT OFFICE.

MARK A. DEES, OF ST. LOUIS, MISSOURI, ASSIGNOR TO AMERICAN TIRE COMPANY, OF ST. LOUIS, MISSOURI, A CORPORATION.

ART OF AND MOLD FOR MAKING RUBBER TIRES.

1,192,994.     Specification of Letters Patent.     Patented Aug. 1, 1916.

Application filed December 23, 1912. Serial No. 738,211.

*To all whom it may concern:*

Be it known that I, MARK A. DEES, a citizen of the United States of America, and a resident of the city of St. Louis and State of Missouri, have invented certain new and useful Improvements in the Art of and Molds for Making Rubber Tires, of which the following is a full, clear and exact description, reference being had to the accompanying drawings, forming a part of this specification.

My invention relates to an improvement in the art of making tires having bodies of rubber, or rubber compound, and also to a mold used in carrying out my improvement in the art of making tires.

The principal object of my present invention is to produce a solid, or what may be more properly termed a semi-solid tire, in such a manner that the rubber or rubber compound in the body of the tire is compacted to a maximum degree previous to vulcanization of the raw rubber.

A further object of the invention is to provide for the production of the tire of the kind stated at a minimum of expense.

A further object of the invention is to follow such steps in the manufacture of a tire of the description referred to whereby I produce a tire having a thick and compact tread, side walls and base, within which is an annular cavity located adjacent to the tire base, serving to provide an annular arch extending throughout the circle of the tire, thereby affording opportunity for inward flexure of the tread when subjected to severe pressure, and lateral flexure of the side walls under similar pressure, both of such displacements rendering the tire much more resilient than the usual solid tire.

Figure I is a top or plan view of the mold utilized in carrying out my improvement in the art of making tires. Fig. II is a vertical cross section through the mold, with a tire formed therein. Fig. III is a view similar to Fig. II with the parts in the mold illustrated as they appear previous to complete closure of the mold, and consequent displacement of the raw tire material therein produced by the closure of the mold. Fig. IV is an enlarged cross section of the pressure medium receiving elements incorporated in a tire in carrying out my invention.

In carrying out my improvement in the art of making tires, I preferably utilize the mold in the accompanying drawings, a description of which will first be given.

1 and 2 designate, respectively, the bottom and top sections of my mold, each of which has an inside mold face, corresponding to the contour of a side of a tire that is to be produced in the mold. The mold section 1 is provided near one of its sides with a vertical annular groove 3, and near its opposite side with a vertical annular groove 4. In the mold section 2 are vertical annular grooves 5 and 6 that, respectively, oppose the grooves 3 and 4.

7 designates a head ring located within the mold, and fitted in the grooves 3 and 5 of the mold sections. 8 is a head ring fitting in the grooves 4 and 6 of the mold sections. Both of these head rings span and close the joints between the mold sections with which they have sliding engagement to permit the adjustment of one mold section relative to the other when the mold is closed to confine the material of a raw tire in the mold cavity previous to carrying out the steps of my improvement in the art of making tires. It should be noted that the head ring 7 is intended to receive the base of the raw tire when placed in the mold, and serves as a backing for such base while the finished tire is being produced. The head ring 8 serves as a facing member for the tread of the tire, in addition to its service as a closure for the outer circumference of the mold cavity. To permit of the head ring 8 performing the first mentioned function, the mold sections 1 and 2 are spaced from each other at the outer section of the mold cavity to furnish a gap through which the tire material may be delivered to the head ring 8. The opposing and contacting faces of the mold sections and the head ring 8 are parallel with each other, as seen most clearly in Fig. II and, due to such engagement, I form joints between the outer faces of the mold sections nearest the mold cavity and the inner face of the head ring 8, through which the material of a tire being molded cannot be expressed when such material is forced outwardly toward the head ring.

My mold includes, in addition to the features already described, means whereby, air, water, or other fluid may be delivered to the interior of the mold, such means preferably comprising a conducting pipe 9 that leads through the head ring 7.

In following my improvement in the art of making tires, I first produce the raw tire by laying an annular body 10 of rubber, or rubber compound, around an annular inner base or foundation 11, the latter being preferably composed of layers of rubberized fabric laid up, as illustrated in Figs II and III of the drawings. Previous, however, to the application of the body 10 to the foundation 11 of the tire, I place within or at the outer side of such foundation means that will permit of a fluid being circulated into the raw tire for the production of an annular cavity therein, and the displacement of the tire body to the wall of the mold cavity, thereby forming the tire into the intended contour. The means just referred to which I have shown in the drawings comprises a rubber tube 12 of ring form, which extends throughout the circle of the raw tire at the point at which the tube is laid therein. Within this tube is a separating medium, preferably strips 13, of paper, by which the walls of the tube are prevented from adhering to each other, and the tube is placed in such condition that there will be no interference by adhesion of its walls such as would prevent inflation of the tube by fluid introduced thereinto through the fluid conducting pipe 9, to which the tube 12 is attached, as illustrated in the drawing.

The fluid receiving tube 12 located within the raw tire, as explained, is preferably inclosed within an envelop 14, that may be of fabric, or other suitable material, and which is provided with overlapping portions located between the tube and the outer circle of the raw tire. This envelop serves as a separating medium between the tube 12 and the raw material in the tire; and its overlapping portions being located as stated, are capable of movement upon each other when the tube 12 is inflated for displacement of the raw rubber body 10, as previously mentioned; and the envelop serves, during its opening movement to regulate the expansion of the tube at all points, in order that the displacing pressure against the raw rubber will be equalized and similar throughout the tire.

While I have shown a rubber tube as a means for permitting the ingress of fluid and its circulation throughout the raw tire for the purpose of displacing the rubber, it is obvious that any other suitable medium may be used in lieu of the rubber tube, which will permit of the entrance into the tire as intended and the circulation of the fluid in an annular passageway within the tire.

I desire to add that the raw body of a tire produced in accordance with my improvement does not need to be laid up with care in so far as its form is concerned, but may be produced in an irregular shape, such as that illustrated in Fig. III. The body should however, by preference be of greater width than it will be in the finished tire, as by so shaping it, I provide for the material in the body being displaced outwardly toward the outer circle of the mold cavity, when the mold is closed from the condition shown in Fig. III to the condition shown in Fig. II.

It will be understood from the foregoing that the procedures involved in carrying out my improvement in the art of making tires consist in first building a raw tire with means therein that will permit of a suitable fluid being introduced into the tire while it is confined in the mold provided for its reception, then introducing the raw tire into the mold, and closing the mold so that the raw material of the tire will be confined in the mold cavity without exudation of the tire material therefrom, and finally introducing a fluid under pressure into the tire at the point where the means for permitting circulation of fluid is located. Upon the introduction of the fluid under pressure, it circulates in the raw tire throughout an annular channel made possible owing to the presence of the means in the tire referred to, and acts to displace the rubber or rubber compound of the tire into contact with the walls of the mold cavity, with the result of rendering the rubber or rubber compound tire body very dense and compact, while at the same time producing an annular channel within the tire that renders the latter more resilient than any solid rubber tire. When the raw tire has been produced in the manner herein described, the mold containing the tire may be subjected to heat in any preferred manner to vulcanize the tube.

It will be understood from the foregoing and from the drawings that the annular tube 12 and the envelop 14 surrounding it are incorporated initially in the tire structure in a deflated and collapsed condition and that therefore these parts initially occupy in toto a position much less remote from the outer circle of the mold cavity in which the tire is formed than the outer circle of the tube occupies when in its inflated condition. This being true, it will be understood also that the rough body 10 of rubber laid upon the foundation 11 of the tire does not initially fill the portion of the mold cavity it eventually fills. Therefore, when the rubber tube 12 is inflated it is expanded from the condition shown in dotted lines Fig. II to the condition shown in full lines in the same view, and as a consequence the mass of rubber in the body 10 is forced outwardly to the wall of the mold cavity thereby becoming shaped to the desired form ready for vulcanization and the completion of the tire having a very thick rubber tread portion and an annular air cushion cavity.

I claim:

1. The herein described improvement in the art of making tires, which consists in roughly forming an annulus of raw rubber around a suitable annular foundation, placing a deflated annular tube within an envelop having overlapping portions capable of movement on each other when the tube is being inflated, confining said annular tube and envelop within said structure, between said annulus of raw rubber and said foundation to permit the circulation of fluid under pressure in an annular course throughout the circle of the uncured tire structure, introducing fluid under pressure into the tube to give the desired shape to the tire structure, and finally curing the raw rubber.

2. The herein described improvement in the art of making tires, which consists in roughly forming an annulus of raw rubber around a suitable foundation, confining within said structure, between said annulus of raw rubber and said foundation a deflated expansible tube inclosed in an envelop having overlapping portions adapted to move toward the opposite sides of the tire structure when the tube is being inflated, introducing fluid under pressure into said expansible tube to give the desired shape to the tire structure, and finally curing said raw rubber.

3. The herein described improvement in the art of making tires, which consists in roughly forming an annulus of raw rubber around a suitable annular foundation, confining within said structure, between said annulus of raw rubber and said foundation a deflated expansible tube inclosed in a fabric envelop having overlapping marginal portions located between said tube and the outer circle of the raw tire, the overlapping portions of said envelop being free to move toward the opposite sides of the tire structure when the tube is being inflated, introducing fluid under pressure into said expansible tube to give the desired shape to the tire structure, and finally curing the raw rubber.

4. The herein described improvement in the art of making tires, which consists in forming an annular inner foundation of layers of fabric, roughly laying an annulus of raw rubber around said structure, between said annulus of raw rubber and said foundation, confining a flattened annular tube within said foundation, placing all of said elements in a suitable mold, introducing fluid under pressure into said flattened annular tube to expand the latter, to give the desired shape to the tire structure, and finally curing said raw rubber.

5. A mold of the character described comprising a pair of opposing mold sections each having annular grooves in its opposing face adjacent the inner and outer margins of the mold section, and head rings fitting in the opposing grooves of the sections spanning the gaps between the sections, the said head rings having sliding engagement with faces of the mold sections parallel with the side faces of the rings, the said mold being provided with four tire receiving walls, two of which are formed by the opposing mold sections, the other two tire receiving walls being formed by said head rings.

MARK A. DEES.

In the presence of—
A. J. McCauley,
E. B. Linn.